May 15, 1928.
L. R. VAN SANT
FUEL BURNING SYSTEM
Filed March 19, 1925
1,669,956
4 Sheets-Sheet 2
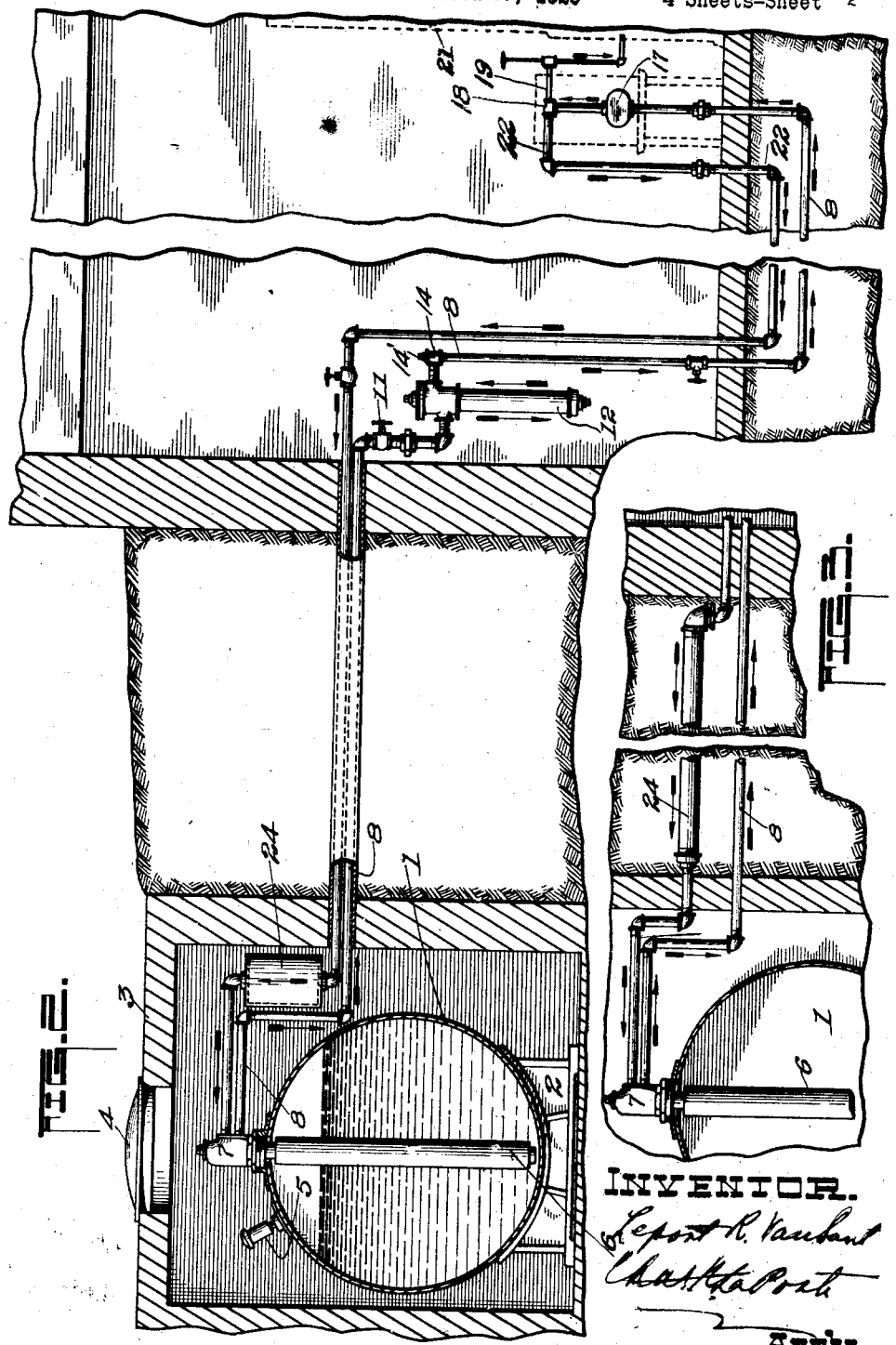

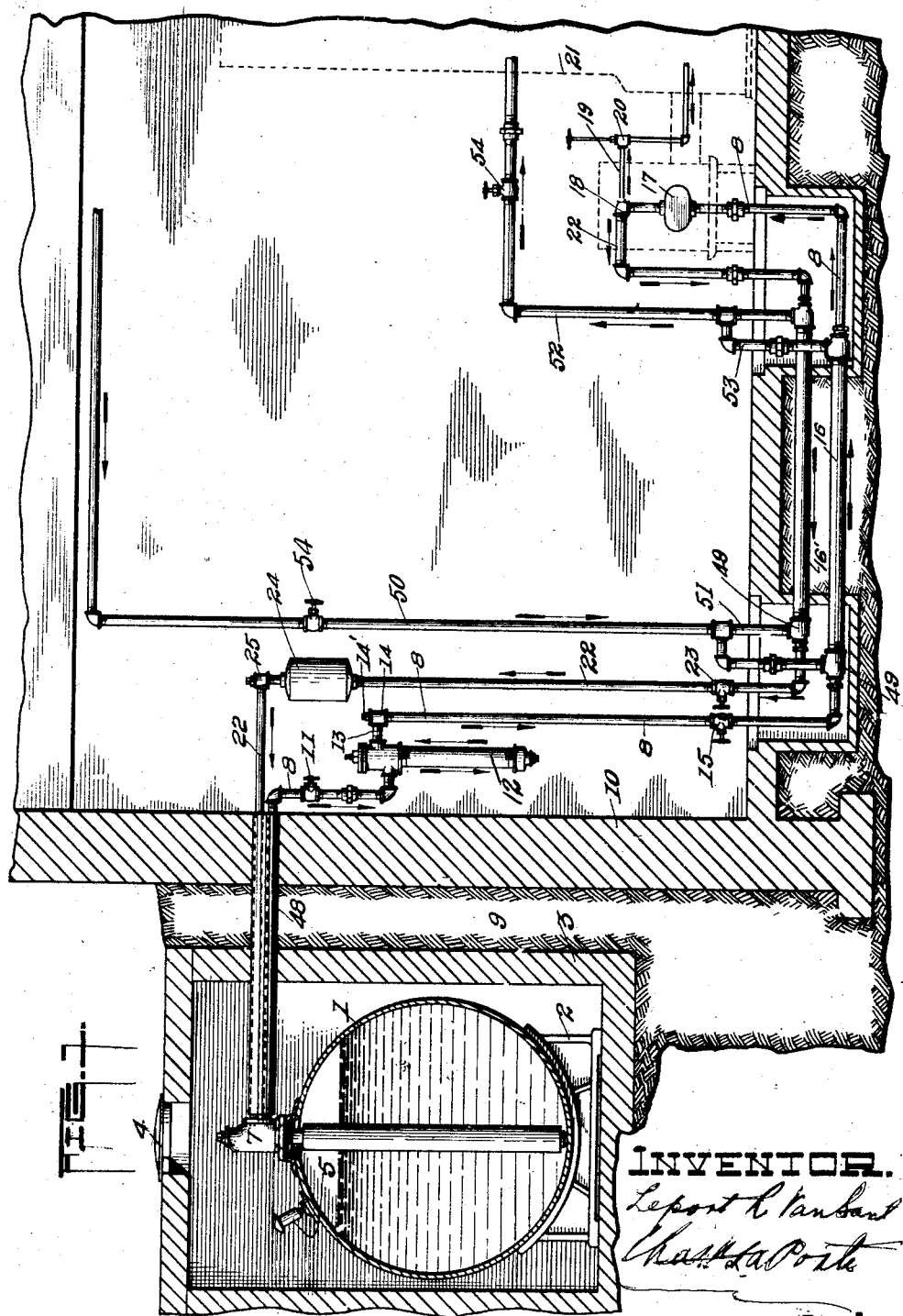

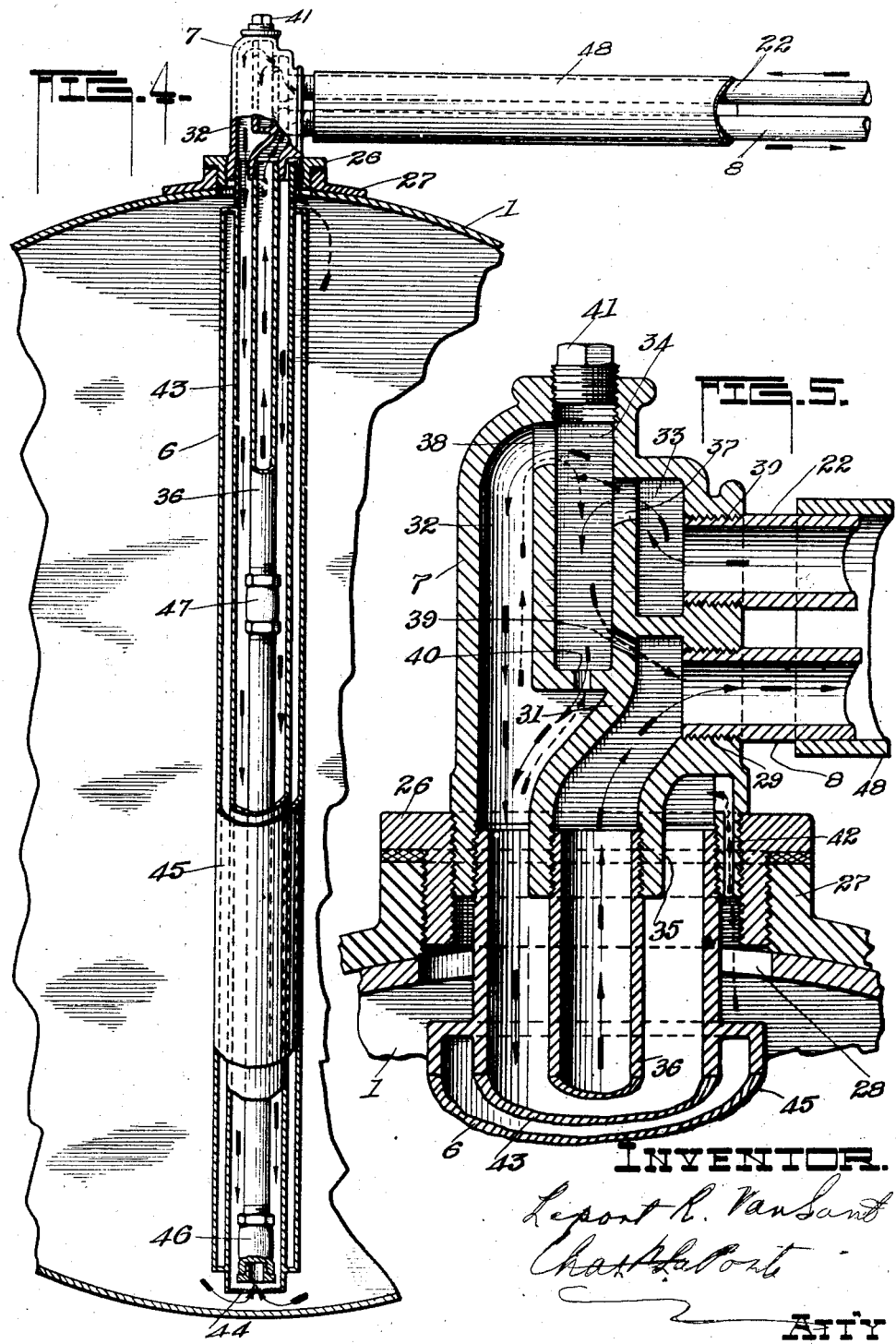

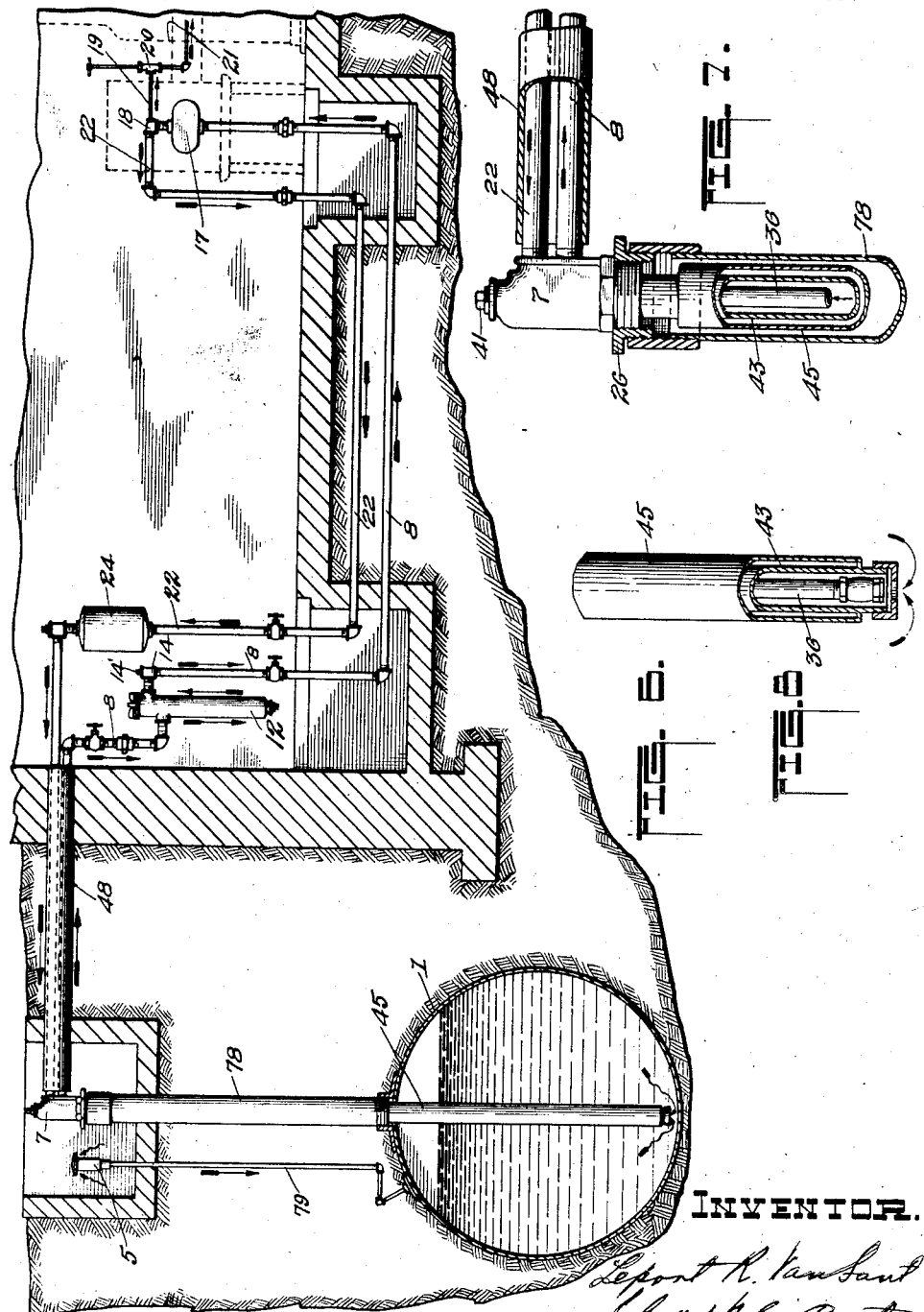

Patented May 15, 1928.

1,669,956

UNITED STATES PATENT OFFICE.

LEPORT R. VAN SANT, OF PEORIA, ILLINOIS.

FUEL-BURNING SYSTEM.

Application filed March 19, 1925. Serial No. 16,630.

This invention has reference to a liquid fuel burning system adapted preferably for use in connection with homes, commercial buildings, ships or aeroplanes, and of the type including a fuel reservoir, a suction and pressure pump and fuel lines comprising preferably a supply and return fuel line communicating with the fuel reservoir and pump, and it has for one of its objects to provide in the fuel lines a controlling means adapted to control the siphonic-action of the fuel therein, and further, to provide means in the return fuel lines to retard the flow of fuel to the controlling means to detect a break or leak in the fuel lines, which are not unlike in purpose and object the subject matter of Letters Patent No. 1,557,488, issued to me October 13, 1925, for improvements in a method and apparatus for controlling the siphon in liquid fuel burning systems.

The invention has for a further object the provision of heating and insulating means in the fuel lines of a fuel burning system, adapted to raise the temperature of the liquid fuel in the fuel lines, said insulating means being further adapted to maintain such temperature and thereby increase the efficiency of the fuel burner in its consumption of fuel.

The invention further comprehends an improvement in the siphon controlling means over that disclosed in the Letters Patent above referred to; the application of the insulating means and to modification in the detecting means in the return fuel lines.

That the invention may be more fully understood, reference is had to the accompanying drawings, illustrating a preferred embodiment of the invention and forming a part of this description, in which:—

Figure 1 is a greatly reduced side elevation and a more or less diagrammatic view, partly in section, showing a preferred form of installation of my fuel burning system;

Figure 2 is a view similar to Figure 1 showing a modified installation;

Figure 3 discloses a portion of the fuel reservoir and fuel lines in communication therewith and shows a modification of the enlarged return fuel line, being shown located in the ground between the wall of the building and fuel reservoir enclosure;

Figure 4 is a detail partly in section showing the controlling means preferably attached to the top of the fuel reservoir and depending from it into the reservoir are the supply and return fuel lines encased by a shell or insulator;

Figure 5 is an enlarged cross-sectional view of the controlling means and shown preferably attached to the top of the fuel reservoir or container;

Figure 6 is a view similar to Figure 1 except it shows an installation in which the reservoir is located in a plane below the burner;

Figure 7 is a sectional detail showing the connection of the siphon controlling means in Figure 6; and Figure 8 is a detail showing the lower end of the connection in the fuel feeding system located within the reservoir.

Like characters of reference denote corresponding parts throughout the figures.

Those who are familiar with the art are aware that liquid fuel burners generally, which are used for heating or power plants for home or commercial purposes, use and burn either fuel oil, kerosene, gasoline, distillate or gas oil, or any grade of liquid fuel depending on its ability for successful combustion. Of the fuel burners now known or in use, there will be found many different and varied types of fuel systems acting in co-operation with the burner intended to supply the liquid fuel from a reservoir or container to the burner for combustion purposes and among those types, there will be found lacking the provision of suitable means for controlling the flow of fuel from the reservoir to the point of consumption and other factors for the making of a safe, economical and positive fuel system.

Referring particularly to the fuel systems intended for use in connection with homes or commercial purposes, fuel storage for the many varied types of fuel burners has its various locations; as in some cases, being placed at a distance from the burner in a reservoir or container placed underground and at different depths, depending upon the method employed to supply the burner with fuel, or in other cases, having the fuel reservoir installed in the basement of a home or dwelling in close proximity to the burner which is dangerous due to possible leakage of the fuel and causing a fire hazard.

It has been the aim of manufacturers of fuel burners and equipment pertaining thereto, to provide a fuel burning system capable of burning preferably a cheap grade of fuel and obtaining the greatest amount of heat units therefrom and particularly of a type which would be safe in the event a leak or break should appear at some point in the fuel lines and prevent the danger of the fuel catching fire. To that end this invention has reference and includes a fuel reservoir located preferably underground and having its discharge outlet preferably at a point above the plane of the burner; communicating with the reservoir and burner is a fuel supply line and at some convenient point in such line a filter or strainer through which the fuel is caused to pass before entering the burner; a return fuel line communicating with the burner and fuel reservoir including an enlarged pipe or container through which the excess fuel is caused to pass; a controlling means for creating a siphon in the fuel lines and controlling the same, and heating means in the fuel lines for increasing the temperature of the fuel and maintaining it for proper combustion.

The invention to be described herein is shown used in connection with any of the well known types of fuel burners and there has been no attempt to show the detailed construction of the burner or its operating parts, except the general outline of the pump and atomizer controlling the ejection of fuel into the furnace or heater, and is to be understood that the invention is capable of operation and use in connection with any of the well known types of fuel burners or grades of fuel. The pump disclosed herein is preferably of the suction and pressure type, the suction created by the pump being utilized to supply the fuel from the fuel reservoir to the pump and the pressure utilized to force the fuel under pressure to the burner which is usually atomized before ignited, the unused portion of the fuel being returned under pressure to the reservoir or container.

In the drawings and in Figures 1 and 2 a fuel reservoir 1 is shown supported on a standard 2 and enclosed by any suitable enclosure 3 having preferably a lid or cover 4 for inspection purposes. An air vent 5 is provided preferably near the top of the reservoir for the ingress and engress of air.

Depending from the top of the inside of the reservoir 1 is an attachment 6, to be described more in detail, and which includes supply and return fuel lines and an insulator, the fuel adapted to enter the supply fuel line at the bottom of the attachment preferably near the bottom of the fuel reservoir. The attachment 6 may be connected to the top of the reservoir in any suitable manner and have communication with a controlling means 7, to be more fully described, but I prefer to suspend it direct from the controlling means which is detachably connected to the reservoir. Leading from the controlling means the supply fuel line 8 takes a horizontal direction out through the enclosure 3, the ground 9 and through the wall of a building 10 and by means of a coupling the pipe or line 8 takes a downwardly direction and is intercepted by a globe valve 11 provided to control the volume of flow of fuel or shut off the same. The fuel supply line 8 continues in its downwardly direction and is connected to a filter 12 preferably near the top thereof. The fuel supply line 8 leaves the filter 12 as an outlet from the same preferably on the opposite side of the inlet and by means of a short nipple 13 is connected to a T 14 provided with a plug for priming and cleaning purposes. The line 8 takes preferably a downward direction from the T 14 and having in its length preferably another globe valve 15 for controlling or shutting off the supply of fuel, the line 8 preferably entering a small pit in the basement-floor of the dwelling and by means of a coupling takes a horizontal direction where the line 8 by means of suitable connections is encased or surrounded by a casing or heating unit 16 for purposes to be later described. The line 8 continuing on and by means of a coupling takes an upwardly direction and is connected to the suction and pressure pump 17. The line 8 leaving the pump on the pressure side thereof is intercepted by a reducer T 18 where a portion of the fuel is directed under pressure into a small pipe or line 19 and passes through a valve 20 for controlling the supply of fuel to the burner, not shown, located within the furnace or heater 21, shown in dotted lines. The direction of flow of liquid fuel from the reservoir 1 through the fuel line 8 to the pump and burner is identified by the directional arrows and will be understood.

Taking an opposite direction from the pipe 19 of the reducer T 18, the return fuel line 22 follows the general direction of the supply fuel line down underneath the basement floor of the building and is similarly enclosed by a casing or heating unit 16'. The return fuel line 22 takes an upwardly direction from the pit in the basement-floor and is intercepted by a globe valve 23 and at a suitable point therein is provided with or has connected thereto an enlarged pipe or container 24 which should preferably have a capacity greater than the entire supply and normal return fuel lines, the purposes and objects of which are to be more fully described. The normal return fuel line 22 leaves one end of the enlarged pipe or container 24 and is intercepted by a T 25 provided with a cleaning and priming plug, and from said T 25 the pipe 22 passes out through the wall of the building paralleling the pipe 8 and extends through the wall of the enclosure 3 and is connected to the return fuel port of the controlling means 7. The direction of flow of unused or excess liquid fuel from the pump 17 through the return fuel line 22 to the reservoir is identified by the directional arrows and will be understood.

The enlarged pipe or container 24 in the return fuel line is shown in Figure 1 as being located in the basement of the home or dwelling; in Figure 2 as being located within the enclosure 3 where the reservoir is located, and in Figure 3 in the ground between the main building and the reservoir enclosure. It being obvious from these modifications that parts of the system may be located as the choice or demands may require.

The siphon controlling means 7 is in the form of an elongated tubular chambered casting, see Figure 5. Its lower end is threaded internally and externally. The outside threads enabling the casting to be detachably connected with a coupling 26 which is in turn arranged for detachable connection with a flange 27 secured to the reservoir 1 and surrounding an opening 28 in the wall thereof. The inside threads of said casting provide for a threaded connection of the upper end of the attachment 6 to said casting and from which said casting the attachment 6 depends within the reservoir 1 through the opening 28 therein, the lower intake end of the attachment 6 being in proximity to the lowermost wall portion of the reservoir 1.

The casting forming the controlling means 7 is preferably cast with superimposed outlet and inlet threaded openings 29 and 30, respectively, from the same side face into the former of which is screwed the intake end of the supply pipe 8, and into the latter of which is screwed the return or discharge end of the pipe 22. Interiorly this casting is formed with an angular and sinuous integral partition wall 31, so shaped and arranged as to provide a large general compartment or chamber 32 which opens into the attachment 6 and with upper parallel spaced chambers or compartments 33 and 34, the former preferably being smaller than the latter and with a depending neck 35 interiorly threaded for the securement thereto of a depending supply pipe 36 which extends down into and throughout the length of the attachment 6 terminating short of the lower end thereof. The portion of the wall 31 separating the chambers or compartments 33 and 34 is provided with a communicating opening 37, the lower wall of which is preferably in the plane of the upper portion of the wall comprising the pipe 22. The portion of the wall 31 separating the chambers or compartments 34 and 32 is provided with a communicating opening 38, the lower wall of which is preferably above the upper wall of the opening 37. That portion of the wall 31 separating the lower end of the compartment or chamber 34 from the upper end of the discharge end of the neck 35 is provided with a communicating aperture 39, while the lower wall portion for the compartment or chamber 34 is provided with an aperture 40, which opens communication between the compartments or chambers 32 and 34, respectively. With the construction just described, it will become apparent that liquid fuel leaving the reservoir passes up through the supply pipe 7, thence out through the neck 35 formed within the casting 37 and into and through the supply pipe 8; also that the liquid fuel returning through the pipe 22 passes through the chamber or compartment 33, opening 37, chamber or compartment 34, and through the openings 38 and 40 into the enlarged chamber 32 of the casting 7 and from thence into the attachment 6, as is clearly identified by the full line arrows in Figures 4 and 5. How the siphon in the system is controlled through the casting 7 will be hereinafter described and also a more detailed description given of the circulation of the liquid fuel from the reservoir through the system.

To enable the cleaning of the chamber or compartment 34 of sediment and to open the aperture 40 in the event of clogging, I provide in the top wall of the chamber or compartment 34 a removable plug 41. There is also provided an air inlet opening 42 in the outside wall of the casting 7, see Figure 5, which opens out of the inner end of the casting so that it is in communication with the interior of the reservoir 1 and its air vent 5 and also communicates with the lower end of the large chamber or compartment 32. It is unnecessary at this point to describe the making and breaking of a siphon in the fuel system through the introduction or non-introduction of air through the air inlet 42, except to here state that air drawn into the supply line of the system enters in through the air inlet 42, passing through the chamber or compartment 32 and finds its way into the supply pipe 8 through either one or both the openings 38 and aperture 40 and the aperture 39, previously referred to. It is to be understood that the apertures 39 and 40 may be enlarged or diminished in size, as practice may require due to the size of the pump.

The attachment 6, which together with the supply pipe 36 is connected to and depends from the casting 7, includes an elongated tubular shell or casing 43 which is open at its upper and lower ends as shown, and covering the lower open end is a foraminated sheet or screen 44 serving as a strainer for the liquid fuel entering the lower end of the tube. Surrounding the tubular shell or casing 43 is a casing 45 and spaced therefrom to form an insulating chamber, the ends of which are sealed by securely fastening the end walls of the casing 45 to the tubular casing 43 in any approved or desired manner. In the drawings the walls of these tubular casings are shown integral, which, of course, could be done by brazing, and if desired, one or more of these insulating chambers may be provided of similar construction of that described and the opening 28 in the wall of the reservoir made large enough to permit insertion and removal of the attachment 6.

Reference being had to Figure 4, the supply pipe 36 within the attachment 6 is provided at or near its lower open end with a check valve 46 and with a check valve 47 within its length at a point preferably mediate its ends, as shown. The functions of these check valves should be obvious, i. e., to prevent liquid fuel in the supply line from draining back into the reservoir and to retain an initial supply of liquid fuel in the supply line.

As it is contemplated to pre-heat the liquid fuel before it reaches the pump 17 and burner 21 to produce a better atomization and again heat the fluid during its return to the reservoir, it will become apparent why I insulate the tubular casing 43 through which the liquid fuel circulates in the attachment 6 in its return to the supply line 6, from the supply of liquid fuel in the reservoir 1 which will naturally be at a much lower temperature than the unused portion of the pre-heated liquid fuel returned through the system. This warm liquid fuel circulating through the tubular casing 43 re-enters the supply pipe 36 with a proportionate quantity of liquid direct from the supply in the reservoir, as will be understood, and in this initially warmed fuel raises the temperature of the fresh liquid fuel before it reaches the heating medium. In this connection, I provide an insulating casing or covering 48 of suitable material in which are encased the supply and return pipes 8 and 22, respectively, and which particularly covers those lengths of the pipes from the interior of the building into the enclosure containing the supply of liquid fuel.

Reference has been made to a means for heating the supply of liquid fuel as it passes to the burner and the excess or unused liquid fuel in its return through the system. Brief mention being made to the casings or housings 16 and 16' through which the supply and return pipes 8 and 22, respectively, pass. I prefer to locate these casings or housings 16 and 16' along those stretches of the pipes 8 and 22 beneath the basement floor, as shown in Figure 1. To the coupling 49 at one end of the casing or housing 16' is connected a pipe 50 leading from a suitable source of supply for conveying a heating medium such as steam or hot water to the housings or casings 16 and 16', a supplementary pipe 51 being provided connecting the pipe 50 with the coupling 49 at the inlet end of the housing or casing 16. Connected to and leading from the coupling 49 at the outgoing end of the casing or housing 16' is a pipe 52 leading back to the source of supply whereby a continuous circulation is provided through the pipes 50 and 52, and 53 is a supplementary pipe connecting the pipe 52 with the coupling 49 at the outgoing end of the casing or housing 16. It will be thus observed that the heating medium circulating through the casings or housings 16 and 16' and around the pipes 8 and 22, respectively, will heat the liquid fluid passing through said pipes to and from the burner. Valves 54 are provided in the pipes 50 and 52 for safety purposes in case of leaks or breaks in such pipes.

While I have described hot water, or steam as a desirable heating medium, it is to be understood that some other form of heating medium may be substituted and used.

In Figures 6, 7 and 8 a modified structure is shown of those parts through which the liquid fuel is fed from the reservoir 1 due to the location of the latter at a considerable depth in the ground and somewhat below the level of the burner. As will be noted there is considerable distance between the reservoir and the controlling member 7, making it desirable to use more than a single insulating casing around the supply pipe 36. The details of this structure is best seen in Figures 7 and 8 where an additional insulating casing 78 is shown provided between the reservoir 1 and the coupling member 7, the supply pipe 36 and the casings 43 and 45 extending down into the reservoir 1 with a modified terminal for the lower end of the casing 43, as shown in Figure 8. Figure 6 omits the heating attachment for the pipes 8 and 22 to simplify the showing but which might or might not be used, as desired. Also in this figure the air vent 5 for the reservoir 1 is connected thereto by an extension pipe 79, but which functions in like manner as previously described.

In the operation of the sytsem, the pump being in operation, liquid fuel is supplied to the burner by suction of the pump being drawn from the reservoir 1 through the supply pipe 36 within the attachment 6, to and through the controlling means 7, thence through the supply pipe 8 and connections including the strainer or filter 12 and the liquid fuel heated by the means shown. The excess or unused liquid fuel being returned to the attachment 6 within the reservoir through the pipe 22 and connections, including the enlarged pipe or container 24 and being heated during the return by the means described.

The function of the enlarged pipe or container 24 in the return fuel line is to make more efficient the operation of the controlling means 7 in its controlling the siphonic-action of the liquid fuel in the system. With the system in operation, should a small break or leak appear in either the supply or return fuel lines 8 and 22, respectively, the discontinuance of the circulation of fuel in the system brought about by the controlling means 7 would depend largely upon the amount of air admitted into the system due to such break or leak in the lines. However, when the system is discontinued by reason of a thermostat or other means, the initial supply of fuel in the lines 8 and 22 is diminished due to loss of fuel by such break or leak and upon attempting to start the system again, the controlling means 7 allows for the entrance of air from the reservoir 1 into the controlling means and supply pipe 8 due to the fact that by reason of such break or leak in either the supply or return fuel lines, the enlarged pipe or container 24 has been wholly or partially drained of its contents and thereby unable to furnish the controlling means with fuel immediately upon the starting of the pump 17, which allows for the entrance of air into the controlling means 7 from the reservoir 1 resulting in the breaking of the siphon in the system and stoppage of flow of fuel in the same until such break or leak is repaired.

The function of the controlling means is to control the siphonic-action of the liquid fuel in the fuel system. Assuming the supply and return fuel lines 8 and 22, respectively, containing liquid fuel and being intact, upon the starting of the pump 17, fuel will be drawn from the reservoir 1 into the supply line 36 of the attachment 6 through the controlling means and into the supply line 8 through the same to and through the filter or strainer 12 to the pump and burner, the unused or excess fuel being returned under pressure through the return fuel line 22 through the enlarged pipe or container 24 and entering the controlling means 7 into the chamber or compartment 33, thence into the compartment or chamber 34 overflowing into the chamber or compartment 32 and thence down into the shell or casing 43 where it is returned to the supply lines 36 and 8 for further circulation. The consumed fuel is replaced by a fresh supply from the reservoir 1 through the screen opening 44 of the attachment 6. It will be understood, that upon the cessation of the pump the flow of fuel in the system will be stopped and with reference to the controlling means 7, the liquid fuel in the chamber or compartment 34 will empty the same through the opening 40 in the bottom wall thereof and fall to the level of the fuel in the casing or shell 43 governed by the level of fuel in the reservoir. The chamber or compartment 33 of the controlling means 7 remains full of fuel upon the cessation of the pump up to the opening or aperture 37 and will be understood, that upon the starting of the pump 17 the fuel in the chamber or compartment 33 will immediately overflow into the chamber or compartment 34 and in turn into the chamber or compartment 32 and seal the controlling means from the entrance of air, which if it gained entrance to the same from the reservoir 1 would cause the pump 17 to suck air instead of liquid fuel, which it is believed will be understood. In case of a break or leak in the fuel lines and the pump were started, it will be seen that the level of fuel in the return fuel line 22 will have fallen, particularly with reference to the chamber or compartment 33 of the controlling means 7, and due to the fact that the fuel is unable to be immediately supplied to the controlling means 7 through the agency of the enlarged pipe or container 24, the chambers or compartments 34 and 32 are devoid of fuel and allow for the entrance of air from the reservoir 1 into the controlling means 7 by means of the air inlet opening 42 where it gains entrance into the supply line 8 by means of the openings or apertures 38, 40 and 39 which prevent the pump from obtaining a further supply of liquid fuel and which breaks the siphon in the system, if one is present. The pump is unable to obtain a supply of fuel and pumps air instead, giving notice to the consumer that a break or leak is present in the fuel system.

What I claim is:—

1. The combination in a liquid fuel burning system including a fuel containing reservoir, a burner, a pump and fuel lines between the reservoir and burner, of a controlling means forming a connection between the fuel lines and the reservoir and having communication with an air supply, a fuel supply pipe suspended within the reservoir and communicating with the controlling means, a return fuel pipe also suspended within said reservoir and communicating with said controlling means, said controlling means arranged to drain fuel therefrom on the cessation of the pump and to replace the drained fuel with air from the air supply, and adapted to receive fuel on the operation of the pump to displace the air and create a siphonic-action in the system, means for applying a heating medium to the fuel lines to raise the temperature of the liquid fuel on its passage from the reservoir to the pump and insulating means forming a casing for the supply and return pipes located within the reservoir.

2. The combination in a liquid fuel burning system including a fuel containing reservoir, a burner, a pump and fuel lines between the reservoir and burner, of a controlling means forming a connection between the fuel lines and the reservoir and having communication with an air supply, a fuel supply pipe suspended within the reservoir with an open lower end and communicating at its upper end with the controlling means and said fuel lines, check valves in the length of said supply pipe, a return fuel pipe also suspended within said reservoir and around said supply pipe and in communication with the open lower end of said supply pipe and with the controlling means, said controlling means arranged to drain fuel therefrom on the cessation of the pump and to replace the drained fuel with air from the air supply, and adapted to receive fuel on the operation of the pump to displace the air and create a siphonic-action in the system, means for applying a heating medium to the fuel lines to raise the temperature of the liquid fuel on its passage from the reservoir to the pump and insulating means for the supply and return pipes located with the reservoir.

3. In combination with a fuel burning system, a body provided with upper and lower substantially alined compartments, a main compartment disposed to one side of the first named compartments and having openings communicating therewith, a fuel supply pipe connected to the lower compartment, a fuel return pipe connected to the upper compartment, and a fuel passage communicating with the main compartment and arranged to drain the same of fuel upon a leak occurring in the system.

4. In combination with a fuel burning system employing a fuel reservoir, a body supported by said reservoir having a pair of depending concentrically arranged tubes secured thereto, means in said body arranged to form a main chamber and a secondary chamber, a fuel supply pipe connected to the secondary chamber, a fuel return pipe connected to the main chamber, said main chamber having openings therein communicating with one of the concentrically arranged tubes and further having an opening communicating with the secondary chamber and arranged to drain the latter when a leak occurs in the system.

5. In combination with a fuel burning system employing a reservoir and a pump, a body supported by the reservoir having means therein formed to provide an upper and a lower chamber having communicating openings, a fuel outlet pipe leading from the reservoir and connected with the lower chamber, a fuel return pipe surrounding the outlet pipe and communicating with the upper chamber, and an air supply passage, said parts being arranged to admit air to the upper chamber and to the lower chamber to break the siphonic action of the fuel upon a leak occurring in the system.

6. In combination with a fuel burning system employing a reservoir and a pump, a body having a partition therein arranged to provide an upper and a lower chamber, a main chamber disposed to one side of the upper and lower chambers, said partition having openings therein whereby the various chambers communicate with one another, a fuel supply pipe leading from the reservoir to the pump through the lower chamber, a fuel return pipe leading to the reservoir from the pump through the upper and main chambers, and an air supply passage, said parts being arranged to admit air to the main chamber and to the lower chamber thereby to break the siphonic action of the fuel in the supply pipe upon a leak occurring in the system.

In witness whereof, I have hereunto affixed my hand this 17th day of March, 1925.

LEPORT R. VAN SANT.